United States Patent [19]

Walinsky

[11] Patent Number: 4,485,223

[45] Date of Patent: Nov. 27, 1984

[54] (METH)ACRYLIC ACID/ITACONIC ACID COPOLYMERS, THEIR PREPARATION AND USE AS ANTISCALANTS

[75] Inventor: Stanley W. Walinsky, Mystic, Conn.

[73] Assignee: Pfizer Inc., New York, N.Y.

[21] Appl. No.: 401,055

[22] Filed: Jul. 22, 1982

Related U.S. Application Data

[63] Continuation of Ser. No. 316,365, Oct. 29, 1981.

[51] Int. Cl.$^3$ .............................................. C08F 2/22
[52] U.S. Cl. ..................................... 526/80; 526/317; 525/902
[58] Field of Search .................... 526/317, 80; 525/902

[56] References Cited

U.S. PATENT DOCUMENTS

| | | | |
|---|---|---|---|
| 2,547,815 | 4/1951 | Johannes de Nie | 526/80 |
| 2,783,217 | 2/1957 | Honn et al. | 526/80 |
| 3,308,067 | 3/1967 | Diehl | 252/161 |
| 3,366,509 | 1/1968 | Coglianese et al. | 117/138.8 |
| 3,507,647 | 4/1970 | Sanders | 96/1.5 |
| 3,738,972 | 6/1973 | Moriyama et al. | 526/80 |

FOREIGN PATENT DOCUMENTS 2054548A 2/1981 United Kingdom .

OTHER PUBLICATIONS

Marvel et al., J. Org. Chem., 24, 599 (1959).
Nagai et al., Kobunshi Kagaku, 17, 748 (1960).

*Primary Examiner*—Joseph L. Schofer
*Assistant Examiner*—Bernard Lipman
*Attorney, Agent, or Firm*—Charles J. Knuth; Peter C. Richardson; Harold W. Ordway

[57] ABSTRACT

Substantially homogeneous (meth)acrylic acid/itaconic acid copolymers of number average molecular weight of 500 to 7000 are prepared by copolymerizing in aqueous solution 5 to 90 mole percent acrylic or methacrylic acid monomer with 95 to 10 mole percent itaconic acid monomer at 80° to 120° C. in the presence of a polymerization initiator, the acrylic or methacrylic acid monomer and at least half of the initiator being added separately and continuously to the itaconic acid monomer throughout the polymerization period. The copolymers are employed at a level of from about 0.1 to 100 ppm for prevention of alkaline calcium and magnesium scale formation, such as during seawater evaporative desalination.

6 Claims, No Drawings

(METH)ACRYLIC ACID/ITACONIC ACID COPOLYMERS, THEIR PREPARATION AND USE AS ANTISCALANTS

CROSS-REFERENCE TO RELATED APPLICATION

This is a continuation-in-part of application Ser. No. 316,365 filed Oct. 29, 1981 and now abandoned.

BACKGROUND OF THE INVENTION

This invention relates to novel copolymers of itaconic acid with acrylic or methacrylic acid, a process for their preparation and their use as antiscalants.

Aqueous systems containing dissolved mineral salts are commonly employed in operations such as heating, cooling and evaporative distillation which involve heat transfer. The salts often become insoluble during the operation and are deposited as scale on the heat transfer surfaces, resulting in reduced heat transfer and eventual failure of the equipment. In general, the mineral scale salts are derived from alkaline earth and other metal cations such as calcium, magnesium, iron and lead, and from anions such as bicarbonate, carbonate, hydroxide, sulfate and phosphate. Many factors influence scale formation and include, for example, the pH of the water, the nature of the dissolved salts and the temperature of the operation.

Numerous additives have been proposed as inhibitors of mineral scaling. Of special importance are those additives known as threshold scale control agents which exhibit scale inhibition at extremely low additive concentrations of even one part per million or less. Included among the threshold scale control agents are acrylic and methacrylic acid homopolymers and copolymers with such as maleic anhydride and fumaric acid. While these additives have proven to be effective at threshold concentrations, their preparation generally involves use of nonaqueous solvent systems which are costly and which introduce the problem of solvent contamination of the polymer product. The need therefore still exists for effective threshold scale control agents which can be simply and inexpensively prepared in such as aqueous solvent systems.

(Meth)acrylic acid/itaconic acid copolymers have been prepared in the past in aqueous systems, but the use of such copolymers as scale inhibitors has not been disclosed. Thus, the (meth)acrylic acid/itaconic copolymer of U.S. Pat. No. 3,308,067 is used as a detergent builder, while that of U.S. Pat. No. 3,366,509 is intended as a sizing agent and the copolymer of U.S. Pat. No. 3,507,647 is employed in lithographic printing. Published United Kingdom application No. GB2054548A discloses the use of a (meth)acrylic acid/itaconic acid copolymer in removing boiler scale. Both Marvel et al, J. Org. Chem., 24, 599 (1959) and Nagai et al, Kobunshi Kagaku, 17, 748 (1960) disclose methods of preparing (meth)acrylic acid/itaconic acid polymers but fail to mention a use for the resulting copolymer. All of these disclosed preparations involve a conventional copolymerization employing an aqueous medium and standard initiator system which results in copolymers of relatively high molecular weight.

It is therefore a primary objective of the present invention to provide a novel process for the preparation of substantially homogeneous (meth)acrylic acid/itaconic acid copolymers of controlled low molecular weight which are particularly effective as threshold scale inhibitors.

SUMMARY OF THE INVENTION

It has now been found that substantially homogeneous, low molecular weight copolymers of acrylic or methacrylic acid, or mixtures thereof, with itaconic acid may be readily prepared by the separate and controlled addition of the (meth)acrylic acid monomer and the polymerization initiator to an aqueous solution of the itaconic acid monomer.

Accordingly, the present invention entails a process for preparing a substantially homogeneous (meth)acrylic acid/itaconic acid copolymer of number average molecular weight of from about 500 to 7000 which comprises contacting in aqueous medium from about 95 to 10 mole percent itaconic acid monomer with from about 5 to 90 mole percent acrylic or methacrylic acid monomer over a period of from about 2 to 8 hours at a temperature of from about 80° to 120° C. in the presence of from about 5 to 20 mole percent polymerization initiator, based on the total amount of the monomers, the acrylic or methacrylic acid monomer and at least half of the initiator being added separately and essentially continuously throughout the period to the itaconic acid monomer in solution in the medium.

In preferred embodiments of the process, from about 95 to 60 mole percent itaconic acid monomer is copolymerized with from about 5 to 40 mole percent methacrylic acid monomer and the initiator is a redox system. Preferably, the itaconic acid monomer and from about 2 to 25 percent of the initiator are initially dissolved in the aqueous medium and the remainder of the initiator is introduced over the polymerization period, and the resulting copolymer solution is maintained at the polymerization temperature for from about 10 to 120 minutes following the addition.

In an especially preferred embodiment of the process, about 5 to 40 mole percent methacrylic acid monomer, from about 1 to 2 mole percent sodium persulfate and from about 6 to 12 mole percent sodium bisulfite are added separately over a period of from about 3 to 5 hours to an aqueous solution of from about 95 to 60 mole percent itaconic acid monomer and from about 0.02 to 0.04 mole percent ferrous sulfate at atmospheric reflux temperature, and the solution is held at that temperature for from about 45 to 75 minutes following the addition.

The present invention also entails a substantially homogeneous copolymer consisting essentially of from about 5 to 90 mole percent acrylic or methacrylic acid units and from about 95 to 10 mole percent itaconic acid units and having a number average molecular weight of from about 500 to 7000. The copolymer has preferably from about 5 to 40 mole percent methacrylic acid units and from about 95 to 60 mole percent itaconic acid units; may be in the form of the alkali metal, ammonium or amine salt thereof; and is normally as an aqueous solution containing from about 1 to 60 weight percent of the copolymer.

The present invention further entails a method for the prevention of scale formation in water containing scale-forming impurities, such as in seawater for desalination, which comprises mixing with the water an effective amount of the copolymer, preferably at a concentration of from about 0.5 to 10 ppm. The method may also comprise addition to the seawater of an amount of such as sulfuric acid to neutralize preferably from about 55 to 85 percent of the bicarbonate alkalinity of the seawater.

DETAILED DESCRIPTION OF THE INVENTION

The novel polymerization process of the present invention, as described herein, provides for the first time essentially homogeneous copolymers of controlled low molecular weight from the copolymerization of major amounts of acrylic or methacrylic acid with itaconic acid. In addition, these novel copolymers exhibit improved antiscalant activity over the (meth)acrylic acid/itaconic acid copolymers of the prior art, thereby resulting in their more efficient utilization during such as the flash evaporation of seawater in preparing potable water.

Homogeneous copolymers are defined by the art as compositions of narrow molecular weight distribution. The distribution is readily determined by such analytical techniques as high pressure liquid chromatography (HPLC) and is essentially mononodal for homogeneous copolymers. Nonhomogeneous copolymers, on the other hand, characteristically have binodal distributions, particularly when the reactivities of the two monomers are very different as is the case with (meth)acrylic acid and itaconic acid. When determined by HPLC, the molecular weight distribution of the substantially homogeneous copolymers of the present invention is essentially mononodal with the ratio of the weight average molecular weight ($MW_W$) to the number average molecular weight ($MW_N$) being less than 3.

In this process, from about 95 to 10 mole percent of itaconic acid is copolymerized in aqueous medium with from about 5 to 90 mole percent of either acrylic acid or methacrylic acid in the presence of a specified amount of polymerization initiator and at specified temperatures and polymerization times, the acrylic acid or methacrylic acid monomer and the initiator being added separately and simultaneously to the itaconic acid monomer. Acrylic acid and methacrylic acid copolymerize in essentially the same manner with itaconic acid, and may therefore be interchanged or mixed in the process to give products with essentially the same molecular weight and antiscalant characteristics for a copolymer of given (meth)acrylic acid/itaconic acid mole ratio.

Since the present process is conducted in aqueous medium, a considerable savings in solvent and processing costs is realized, the problem of solvent contamination of the product does not exist, and the necessity of isolating the product from the final reaction solution is eliminated. The amount of water present during the polymerization is critical only to the extent that the reaction mixture remains a solution throughout the polymerization and is concentrated enough to fulfill the time and temperature process parameters. Thus, the polymerization will normally be conducted at a monomer concentration slightly below the aqueous solubility of both itaconic acid and the resulting copolymer, generally in the range of from about 0.75 to 100 grams water per gram total monomer. While the polymerization is preferably conducted in water alone, the possibility of the presence of minor amounts of water-soluble solvent, if such is desired, is not excluded.

Any water-soluble, free-radical initiator may be used as the polymerization initiator of this process. Suitable initiators include persulfates such as sodium and potassium persulfate as well as redox systems. The redox system, such as ferrous sulfate/sodium persulfate/sodium bisulfite, is preferred. The polymerization initiator should be present in the amount of from about 5 to 20 mole percent based on the total amount of the monomers. All or at least half of the initiator is added, separately from the (meth)acrylic acid monomer, essentially continuously throughout the polymerization period. Preferably, from about 2 to 25 percent of the initiator is dissolved along with the itaconic acid in the aqueous medium and the remainder of the initiator is then introduced, as an aqueous solution, over the polymerization period. The concentration of the initiator in the aqueous addition solution is normally from about 5 to 25 weight percent.

The temperature and duration of the polymerization are influential in determining the nature of the resulting copolymer. The polymerization is therefore limited to temperatures of from about 80° to 120° C. for monomer addition periods of from about 2 to 8 hours. Polymerization at atmospheric reflux is preferred. Since the presence of a minimum amount of monomer in the final product is desired, the final polymerization solution is generally maintained at the polymerization temperature for a period, preferably from about 10 to 120 minutes, following the completion of the (meth)acrylic acid monomer and initiator addition period.

By the selection of the above reaction parameters within the specified ranges, essentially homogeneous (meth)acrylic acid/itaconic acid copolymers with number average molecular weights of from about 500 to 7000, preferably from about 1000 to 4000, are readily prepared. Thus, the lower molecular weights are obtained by employing more dilute solutions at the higher temperatures with larger amounts of initiator and shorter addition times. Conversely, the higher molecular weights are realized in more concentrated solutions at the lower temperatures with smaller amounts of initiator and longer addition periods.

Preferred embodiments of the instant process include those in which from about 5 to 40 mole percent methacrylic acid is copolymerized with from about 95 to 60 mole percent itaconic acid. In an especially preferred process, about 5 to 40 mole percent methacrylic acid, 1 to 2 mole percent sodium persulfate and 6 to 12 mole percent sodium bisulfite are added separately over a period of about 3 to 5 hours to an aqueous solution of about 60 to 95 mole percent itaconic acid and 0.02 to 0.04 mole percent ferrous sulfate at atmospheric reflux temperature, and the polymerization solution is held at the reflux temperature for an additional 45 to 75 minutes following the addition.

The essentially homogeneous copolymer consisting essentially of from about 5 to 90 mole percent acrylic or methacrylic acid units and from about 95 to 10 mole percent itaconic acid units and having a number average molecular weight of from about 500 to 7000 may be isolated in solid form from the final polymerization solution by standard techniques, such as evaporation followed by drying. However, since the copolymer will normally be added to aqueous systems, the final polymerization solution, as such, diluted or concentrated as desired, will generally be used without isolation of the copolymer product. This solution may also be neutralized to form an aqueous solution of the alkali metal, ammonium or amine salt of the copolymer. Alkali metal bases suitable for the neutralization include sodium hydroxide, potassium hydroxide and lithium hydroxide, while suitable ammonium and amine bases include ammonia, ammonium hydroxide, mono-, di-and trialkyl amines having 1 to 5 carbon atoms in each alkyl group, pyridine, morpholine and lutidine.

The essentially homogeneous (meth)acrylic acid/itaconic acid copolymers of the present invention, while having general threshold scale-inhibiting properties, are especially useful in the prevention of alkaline calcium and magnesium scale formation in such processes as the evaporative desalination of seawater. In such use, the copolymer is added to the water being treated in an effective amount, normally at a level from about 0.1 to 100 ppm and preferably from about 0.5 to 10 ppm, to inhibit scale formation. In such addition, the aqueous copolymer solution at about 1 to 60 weight percent copolymer or salt equivalent thereof may be metered directly into the stream being treated, but preferably is diluted with water to a concentration of about 0.1 to 1 weight percent before being added. Evaluation of these essentially homogeneous, controlled low molecular weight copolymers has shown them to be superior to the (meth)acrylic acid/itaconic acid copolymers of the prior art.

Other additives commonly used in combination with threshold scale inhibitors are also effective with the novel inhibitors of the present invention. Especially useful are mineral acids, especially sulfuric acid, whereby part of the bicarbonate alkalinity present in such as seawater to be desalinated is neutralized; the extent of the bicarbonate neutralization is normally from about 30 to 85 percent, especially from about 55 to 85 percent. Foam control agents, corrosion inhibitors and oxygen scavengers, for example, may also be utilized with these novel scale inhibitors.

The following examples are merely illustrative and are not to be construed as limiting the invention, the scope of which is defined by the appended claims.

EXAMPLE 1

130.1 g (0.70 mole) itaconic acid and 5.95 g (0.025 mole) sodium persulfate were dissolved in 100 ml distilled water contained in a 300 ml round bottom flask equipped with stirrer, reflux condenser and nitrogen inlet. The system was purged with nitrogen and the solution then heated to reflux under the nitrogen atmosphere. Separate streams of 25.8 g (0.30 mole) methacrylic acid and an aqueous solution of 17.9 g (0.075 mole) sodium persulfate in 60 ml water were added continuously by means of syringe pumps to the refluxing solution over a 5-hour period. Once the addition was completed, the solution was refluxed (103° C.) for an additional 60 minutes. The resulting solution was then distilled atmospherically to remove 30 ml water and produce a concentrate of 239.7 g of an orange solution containing 58.4 weight percent solids. This represents a 99.5 weight percent product yield based on the combined weight of the charged monomers and the sodium persulfate initiator.

The molecular weight distribution and chemical homogeneity of the polymer product was determined by high pressure liquid chromatography (HPLC) on a series of three 25 cm 60 Å u-Porasil gel permeation columns using an acetate-phosphate buffer eluant adjusted to pH 7.4 with 1N aqueous sodium hydroxide, the Porasil columns being calibrated with 1,2,3,4-butanetetracarboxylic acid and Goodrite K 732 and K 752 polyacrylates of known molecular weight. This analysis indicated the product to be a homogeneous copolymer with a number average molecular weight of 1600 and a weight average molecular weight of 2940.

EXAMPLE 2

The preparation of Example 1 was repeated using various acrylic acid/itaconic acid and methacrylic acid/itaconic acid monomer ratios and various mole percents of sodium persulfate initiator to total monomer as indicated in Table I. Each preparation resulted in an essentially homogeneous copolymer product having the indicated number and weight average molecular weights.

EXAMPLE 3

To the stirred reactor of Example 1 was charged 68 ml water, 0.08 g (0.3 millimole) ferrous sulfate heptahydrate and 39.0 g (0.30 mole) itaconic acid. The reactor was purged with nitrogen and the resulting solution was heated to reflux (100° C.) while maintaining a positive nitrogen atmosphere. Separate streams of 3.69 g (15.0 millimole) sodium persulfate in 38 ml water, 9.92 g (95.0 millimole) sodium bisulfite in 30 ml water and 50.4 g (0.70 mole) glacial acrylic acid were added continuously over 3.5 hours to the refluxing solution. Once the simultaneous additions were completed, the solution was maintained at reflux for an additional 60 minutes. The resulting yellow solution weighed 205.6 g with a solids content of 52.8 weight percent, representing a 105.2 weight percent yield based on the charged reactants. HPLC analysis of the product solution indicated the product to be a substantially homogeneous (meth)acrylic acid/itaconic acid copolymer of number average molecular weight 2210 and weight average molecular weight of 4460.

The preparation was repeated using an itaconic acid/acrylic acid mole ratio of 70/30 and a redox initiator of 1.5 mole percent sodium persulfate, 9.5 mole percent sodium bisulfite and 0.03 mole percent ferrous sulfate, resulting in a 68.2 weight percent product yield of a substantially homogeneous (meth)acrylic acid/itaconic acid copolymer of number average molecular weight 900 and weight average molecular weight of 1910.

EXAMPLE 4

The preparation of Example 1 is repeated with the exception that 123.5 g (0.95 mole) of itaconic acid is copolymerized at 80° C. with 4.3 g (0.05 mole) methacrylic acid in the presence of 47.6 g (20 mole percent) sodium persulfate. The glacial methacrylic acid and all of the sodium persulfate (as a 10 weight percent aqueous solution) are added continuously as separate streams over an 8-hour period. Heating is continued for an additional 10 minutes once the additions are complete. A substantially homogeneous low molecular weight (meth)acrylic acid/itaconic acid copolymer similar to that of Example 1 is obtained.

COMPARATIVE EXAMPLE 1

A (meth)acrylic acid/itaconic acid copolymer (65/35 acrylic acid/itaconic acid) was prepared in water following the procedure of C. S. Marvel and T. H. Shepherd, Journal Organic Chemistry, Volume 24, page 599 (1959). A copolymer of number average molecular weight greater than 8000 as determined by HPLC was obtained in high yield.

COMPARATIVE EXAMPLE 2

(Meth)acrylic acid/itaconic acid copolymers (50/50 acrylic acid/itaconic acid and methacrylic acid/itaconic acid) were prepared following the procedure described in Example 1 of U.S. Pat. No. 3,366,509. The methacrylic acid/itaconic acid copolymer formed a rubbery gel in water which hindered isolation and prevented scale control testing. The acrylic acid/itaconic acid copolymer was obtained in essentially quantitative yield and possessed a number average molecular weight of greater than 10,000 as determined by HPLC.

EXAMPLE 5

Methacrylic acid/itaconic acid and acrylic acid/itaconic acid copolymers of the preceding examples were tested in a laboratory single-stage flash evaporator using a synthetic seawater to determine their scale control performances. The operation of the laboratory evaporator and the method of testing was as described by Auerbach and Carruthers in Desalination, 31, 279 (1979). The synthetic seawater was the "Standard Synthetic Seawater Composition" of the Office of Saline Water containing an augmented bicarbonate content of 0.25 g/kg to increase the scaling potential. The copolymer concentration in the testing was 3 parts per million on an active solids basis.

Results of the testing are summarized in Table II. The percent deposited scale is calculated from the equation:

$$\% \text{ deposited scale} = \frac{200 \times \text{millimoles deposited scale}}{\text{millimoles bicarbonate in brine}}.$$

Copolymers which provide lower "% deposited scale" at a given dosage afford superior performance.

TABLE I

Copolymerization of Acrylic Acid or Methacrylic Acid with Itaconic Acid Using Sodium Persulfate Initiator

| | | Init.,[2] | Product | | |
|---|---|---|---|---|---|
| Ex | Co-polymer[1] | Mole Ratio | Mole % | Yield, Wgt %[3] | $MW_N$[4] | $MW_W$[5] |
| 2A | IA/MAA | 90/10 | 15 | 96.9 | 1310 | 2230 |
| 2B | IA/AA | 90/10 | 15 | 96.9 | 1550 | 2780 |
| 2C | IA/MAA | 70/30 | 10 | 99.5 | 1600 | 2940 |
| 2D | IA/MAA | 70/30 | 5 | 98.4 | 2640 | 4460 |
| 2E | IA/MAA | 50/50 | 15 | 96.2 | 1300 | 2410 |
| 2F | IA/MAA | 10/90 | 15 | 98.2 | 1330 | 2650 |

[1]IA = itaconic acid; MAA = methacrylic acid; AA = acrylic acid
[2]sodium persulfate initiator, mole % total monomer
[3]solids as weight % of monomers plus initiator
[4]number average molecular weight
[5]weight average molecular weight

TABLE II

Antiscalant Scale Inhibition

| Copolymer | Example | % Deposited Scale |
|---|---|---|
| IA/MAA, 90/10 | 2A | 19.4 |
| IA/MAA, 50/50 | 2E | 18.5 |
| IA/MAA, 10/90 | 2F | 21.0 |
| IA/AA, 70/30 | 3 | 19.6 |
| IA/AA, 35/65 | Comp 1 | 24.3 |
| IA/AA, 50/50 | Comp 2 | 38.2 |
| Control (no additive) | | 48.5 |

I claim:
1. A process for preparing a substantially homogeneous (meth)acrylic acid/itaconic acid copolymer of number average molecular weight from about 500 to 7000, which comprises:
   contacting in aqueous medium from about 95 to 10 mole percent itaconic acid monomer with from about 5 to 90 mole percent acrylic or methacrylic acid monomer over a period of from about 2 to 8 hours at a temperature of from about 80° to 120° C. in the presence of from about 5 to 20 mole percent polymerization initiator, based on the total amount of said monomers,
   said acrylic or methacrylic acid monomer and at least half of said initiator being added separately and essentially continuously throughout said period to said itaconic acid monomer in solution in said medium.

2. The process of claim 1 wherein said itaconic acid monomer and from about 2 to 25 percent of said initiator are dissolved in said medium and the remainder of said initiator is introduced over said period.

3. The process of claim 1 or 2 wherein the resulting copolymer solution is maintained at said temperature for from about 10 to 120 minutes following said addition.

4. The process of claim 1 wherein said initiator is a redox system.

5. The process of claim 1 wherein from about 95 to 60 mole percent itaconic acid monomer is copolymerized with from about 5 to 40 mole percent methacrylic acid monomer.

6. The process of claim 3 wherein from about 5 to 40 mole percent methacrylic acid monomer, from about 1 to 2 mole percent sodium persulfate and from about 6 to 12 mole percent sodium bisulfite are added separately over a period of from about 3 to 5 hours to an aqueous solution of from about 95 to 60 mole percent itaconic acid monomer and from about 0.02 to 0.04 mole percent ferrous sulfate at atmospheric reflux temperature, and said solution is held at that temperature for from about 45 to 75 minutes following said addition.

* * * * *